Sept. 30, 1958 M. P. REHORN 2,854,310
HIGH FREQUENCY RECORDING
Filed Jan. 19, 1953
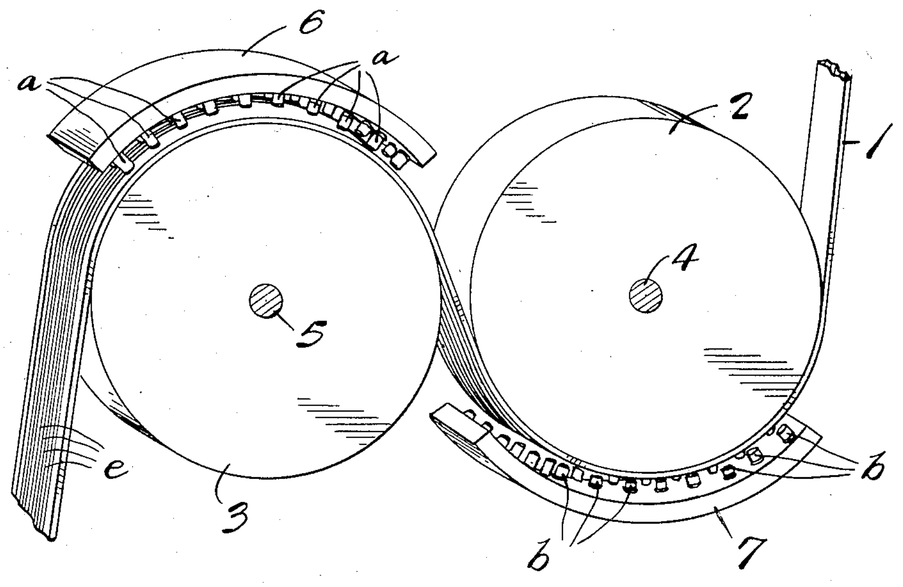
INVENTOR.
Miles P. Rehorn

United States Patent Office 2,854,310

Patented Sept. 30, 1958

2,854,310

HIGH FREQUENCY RECORDING

Miles P. Rehorn, Apple Creek, Ohio

Application January 19, 1953, Serial No. 331,899

6 Claims. (Cl. 346—74)

This invention relates to the recording of high, very high, and ultra high frequency signals. The invention is applicable to the recording of high fidelity audio signals, telephoto signals and particularly to the recording of television frequencies.

In all systems for the recording of high frequencies of which I am aware, there are certain problems which arise either from the friction of the recording tape, film or similar medium with the supporting elements over which the said recording media pass, or from the slight skewing of the said media as it passes under the recording or reproducing heads. These problems are particularly troublesome when magnetic recording on magnetic tape is the method used.

Accordingly, the object of this invention is to provide means for eliminating the above said problems.

More specifically, the object of the invention is to provide means whereby said recording medium may pass under the recording or reproducing heads without appreciable friction with the supporting elements, and to hold the said medium rigid as it so moves, so that there is no skewing of the said tape or similar recording medium.

Another object of the invention is to, while coping with the above said problems, utilize both sides of the said tape or similar recording medium.

The present application is a continuation in part of my co-pending application, filed March 26, 1951, Serial No. 217,556, "Wide Frequency Band Signal Recording," in which a method of recording high frequency signals is disclosed, along with various applications of the said invention including sound or motion picture film, telephoto processes, and the recording of television frequencies.

Referring to the drawing, a schematic view of the invention is shown in which there is neither appreciable friction nor skewing of the tape.

The tape 1, which is made of some suitable material such as cellulose acetate, or paper, comprises on both sides thereof a plurality of magnetic tracks *e*. The tape 1, with its magnetic tracks *e* (old in the art), is trained over the drums 2 and 3, mounted for free rotation about their axes 4 and 5. The stationary arc-shaped plates 6, 7 are concentric with the drums, and carry the recording and/or reproducing heads *a*, *b* which are either in contact with or close to but not touching the tracks *e*. The tape is held taut and driven at a constant speed. The drums prevent skewing of the tape and maintain the magnetic tracks in register with the heads *a*, *b*. (That is, each of the magnetic tracks is scanned by one of the magnetic heads *a*, *b*.) The said heads are so arranged in the plates 6, 7 with respect to the tracks that they (the heads) do not interfere with each other. A staggered arrangement is ideal because it permits a larger number of both tracks and heads to be utilized on a narrower tape.

Modifications may be resorted to within the scope of my invention, as defined in the appended claims.

I claim:

1. In a high frequency recording reproducing system, the combination of a recording tape having on both sides thereof a plurality of recording tracks, a plurality of cylindrical drums over a portion of the cylindrical surface of which the said tape is stretched, the same drums serving to hold the said tape taut, said tape being threaded over the top of one drum and across the bottom of the other drum thus preventing the skewing of the tape as it passes over the said drums, and a plurality of recording reproducing heads, the said heads being in different groups, one group for each portion of the tape which passes over the said drums respectively, each group of the said heads being in curved arrangement to fit the curve of the said tape as it passes around the curve of its said drum, and a supporting element for holding each said group of recording reproducing heads in their said curved position and in contact with the said recording tracks respectively.

2. In a high frequency recording system, the combination of a recording tape having on both sides thereof a plurality of recording tracks, a plurality of cylindrical drums over a portion of the cylindrical surface of which the said tape is stretched, the said drums serving to hold the said tape taut, said tape being threaded over the top of one drum and across the bottom of the other drum thus preventing the skewing of the tape as it passes over the said drums, and a plurality of recording heads, the said heads being in different groups, one group for each portion of the tape which passes over the said drums respectively, each group of the said heads being in curved arrangement to fit the curve of the said tape as it passes around the curve of its said drum, and a supporting element for holding each said group of recording heads in their said curved position and in contact with the said recording tracks respectively.

3. In a high frequency reproducing system, the combination of a recording tape having on both sides thereof a plurality of recording tracks, a plurality of cylindrical drums over a portion of the cylindrical surface of which the said tape is stretched, the said drums serving to hold the said tape taut, said tape being threaded over the top of one drum and across the bottom of the other drum thus preventing the skewing of the tape as it passes over the said drums, and a plurality of reproducing heads, the said heads being in different groups, one group for each portion of the tape which passes over the said drums respectively, each group of the said heads being in curved arrangement to fit the curve of the said tape as it passes around the curve of its said drum, and a supporting element for holding each said group of the said reproducing heads in their said curved position and in contact with the said recording tracks respectively.

4. The combination of claim 1, the said recording tracks being magnetic tracks, and the said recording reproducing heads being magnetic recording reproducing heads.

5. The combination of claim 2, the said recording tracks being magnetic tracks, and the said recording heads being magnetic recording heads.

6. The combination of claim 3, the said recording tracks being magnetic tracks, and the said reproducing heads being magnetic reproducing heads.

References Cited in the file of this patent

UNITED STATES PATENTS

| | | |
|---|---|---|
| 2,540,654 | Cohen | Feb. 6, 1951 |
| 2,637,785 | Charlin | May 5, 1953 |
| 2,708,693 | Hendrickson | May 17, 1955 |

FOREIGN PATENTS

| | | |
|---|---|---|
| 69,273 | Norway | May 28, 1945 |